United States Patent
Song et al.

(10) Patent No.: US 9,100,492 B2
(45) Date of Patent: Aug. 4, 2015

(54) MOBILE COMMUNICATION TERMINAL AND OPERATING METHOD THEREOF

(71) Applicant: Electronics and Telecommunications Research Institute, Daejeon (KR)

(72) Inventors: Hwa Jeon Song, Daejeon (KR); Ho Young Jung, Daejeon (KR); Yun Keun Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 160 days.

(21) Appl. No.: 14/018,068

(22) Filed: Sep. 4, 2013

(65) Prior Publication Data

US 2014/0221043 A1    Aug. 7, 2014

(30) Foreign Application Priority Data

Feb. 4, 2013  (KR) .......................... 10-2013-0012429

(51) Int. Cl.
  *H04N 7/14*    (2006.01)
  *H04M 1/725*    (2006.01)
  *G10L 15/25*    (2013.01)

(52) U.S. Cl.
  CPC ........... *H04M 1/72519* (2013.01); *G10L 15/25* (2013.01); *H04M 2250/52* (2013.01); *H04M 2250/74* (2013.01)

(58) Field of Classification Search
  CPC ..................... H04M 1/72519; H04M 2250/52; H04M 2250/74; G10L 15/25
  USPC ............... 455/556.1, 145, 557, 66.1, 566; 348/14.01, 207.11, 207.2, 208.99, 348/222.1, 231.99, 211.1, 14.12, 14.13, 348/220.1; 358/302, 405, 426.01, 426.03, 358/126.06, 448, 452; 725/165; 382/232
  See application file for complete search history.

(56) References Cited

U.S. PATENT DOCUMENTS

| | | | |
|---|---|---|---|
| 2007/0255571 A1* | 11/2007 | Noh et al. ...................... | 704/275 |
| 2008/0285779 A1* | 11/2008 | Naito .............................. | 381/306 |
| 2010/0007665 A1* | 1/2010 | Smith et al. .................... | 345/473 |
| 2010/0075712 A1* | 3/2010 | Sethuraman et al. ......... | 455/556.1 |
| 2010/0220552 A1* | 9/2010 | Owaki et al. .................. | 367/127 |
| 2011/0257971 A1 | 10/2011 | Morrison | |
| 2011/0311144 A1 | 12/2011 | Tardif | |
| 2011/0317006 A1* | 12/2011 | Kuboyama et al. ........... | 348/140 |
| 2013/0021266 A1* | 1/2013 | Selim ............................. | 345/173 |

FOREIGN PATENT DOCUMENTS

KR    10-2011-0066628    6/2011

\* cited by examiner

*Primary Examiner* — Dominic E Rego
(74) *Attorney, Agent, or Firm* — Kile Park Reed & Houtteman PLLC

(57) ABSTRACT

Provided is a mobile communication terminal including: a camera module which captures an image of a set area; a microphone module which, when a sound including a voice of a user is input, extracts a sound level corresponding to the sound and a sound generating position; and a control module which estimates a position of a lip of the user from the image, extracts a voice level from the sound level corresponding to the position of the lip of the user and a voice generating position from the sound generating position, and recognizes the voice of the user based on at least one of the voice level and the voice generating position.

20 Claims, 3 Drawing Sheets

MOBILE COMMUNICATION TERMINAL AND OPERATING METHOD THEREOF

CROSS-REFERENCE TO RELATED APPLICATIONS

This application claims priority to and the benefit of Korean Patent Application No. 10-2013-0012429 filed in the Korean Intellectual Property Office on Feb. 4, 2013, the entire contents of which are incorporated herein by reference.

TECHNICAL FIELD

Embodiments relate to a mobile communication terminal and an operating method thereof, and more particularly, to a mobile communication terminal which easily recognizes a voice of a user when a sound including the voice of the user is input, and an operating method thereof.

BACKGROUND ART

Recently, lots of devices with a prefix label of smart devices have been launched. Among them, a smart phone and a smart TV form the largest market, and lots of services based on the equipment are also launched. Specifically, a voice recognition system is basically mounted on the equipment for a smart interface to be released to the market. This function is mounted on the equipment so as to be widely utilized as an advertisement that the equipment is provided with the best technology.

However, the most important part in the voice recognition system is to precisely detect a voice uttered from the user. Even though it is impossible to perfectly detect an actual voice of the user from numerous surrounding noises, if a sensor, which is basically mounted on equipment which is currently launched, is efficiently and comprehensively used, an error may be minimized.

Currently, a smart TV or a smart phone is generally attached with several microphones and one or two cameras. By doing this, a voice, which is not affected by the noise, is accepted to remove the noise and to be utilized for voice recognition. A service, which utilizes a technique such as face recognition and gesture recognition using a camera, is also provided.

From the related art, a lip-reading technique based on image recognition has been suggested so that a method, which more precisely detects and recognizes a voice in a noisy situation, has been developed. Most of the methods recognize a face, then recognize lips and tracks changes of the lip motion so as to use information obtained by tracking the changes of the lips as an auxiliary means for voice recognition. However, in a place with an illumination noise, for example, a place where the illumination is dark, it is impossible to track a motion of the lip.

Recently, a lip-reading technique based on voice recognition and image recognition is being studied.

SUMMARY OF THE INVENTION

The present invention has been made in an effort to provide a mobile communication terminal which easily recognizes a voice of a user when a sound including the voice of the user is input and an operation method thereof.

A first exemplary embodiment of the present invention provides a mobile communication terminal including a camera module which captures an image of a set area; a microphone module which, when a sound including a voice of a user is input, extracts a sound level and a sound generating position corresponding to the sound; and a control module which estimates a position of a lip of the user from the image, extracts a voice level from the sound level corresponding to the position of the lip of the user and a voice generating position from the sound generating position, and recognizes the voice of the user based on at least one of the voice level and the voice generating position.

Another exemplary embodiment of the present invention provides an operation method of the mobile communication terminal according to the first exemplary embodiment including capturing an image of a set area; when a sound including a voice of a user is input, extracting a sound level and a sound generating position corresponding to the sound; and estimating a position of a lip of the user from the image, extracting a voice level from the sound level corresponding to the position of the lip of the user and a voice generating position from the sound generating position, and recognizing the voice of the user based on at least one of the voice level and the voice generating position.

A second exemplary embodiment of the present invention provides a mobile communication terminal including a camera module which extracts an image of a user during a video call; a microphone module which, when a sound including a voice of a user is input, extracts a sound level and a sound generating position corresponding to the sound; and a control module which estimates a position of a lip of the user included in the user image, extracts a voice generating position corresponding to the position of the lip of the user from the sound generating position and a voice level corresponding to the voice generating position from the sound level, recognizes the voice of the user, and generates image data in which the user image and the user voice are mixed.

The mobile communication terminal and the operation method thereof according to the exemplary embodiments extract a sound level and a sound generating position when a sound including a voice of a user is input in an environment having lots of noises (noise components), estimate a position of a lip of the user from an image captured by a camera module, extract a voice level corresponding to the voice of the user from the sound level and a voice generating position corresponding to the voice of the user from the sound generating position, and recognize the sound of the user, thereby improving a recognition rate for a user sound and improving a quality for user voice recognition when a phone call mode or a voice recognition function is performed.

The mobile communication terminal and the operation method thereof according to the exemplary embodiments remove a noise by detecting a voice of the user, thereby significantly reducing an amount of packets which are transmitted through data communication.

The mobile communication terminal and the operation method thereof according to the exemplary embodiments use sensor values input from a plurality of sensors provided in the mobile communication terminal, thereby precisely recognizing and detect the voice of the user.

The foregoing summary is illustrative only and is not intended to be in any way limiting. In addition to the illustrative aspects, embodiments, and features described above, further aspects, embodiments, and features will become apparent by reference to the drawings and the following detailed description.

Figure 1:
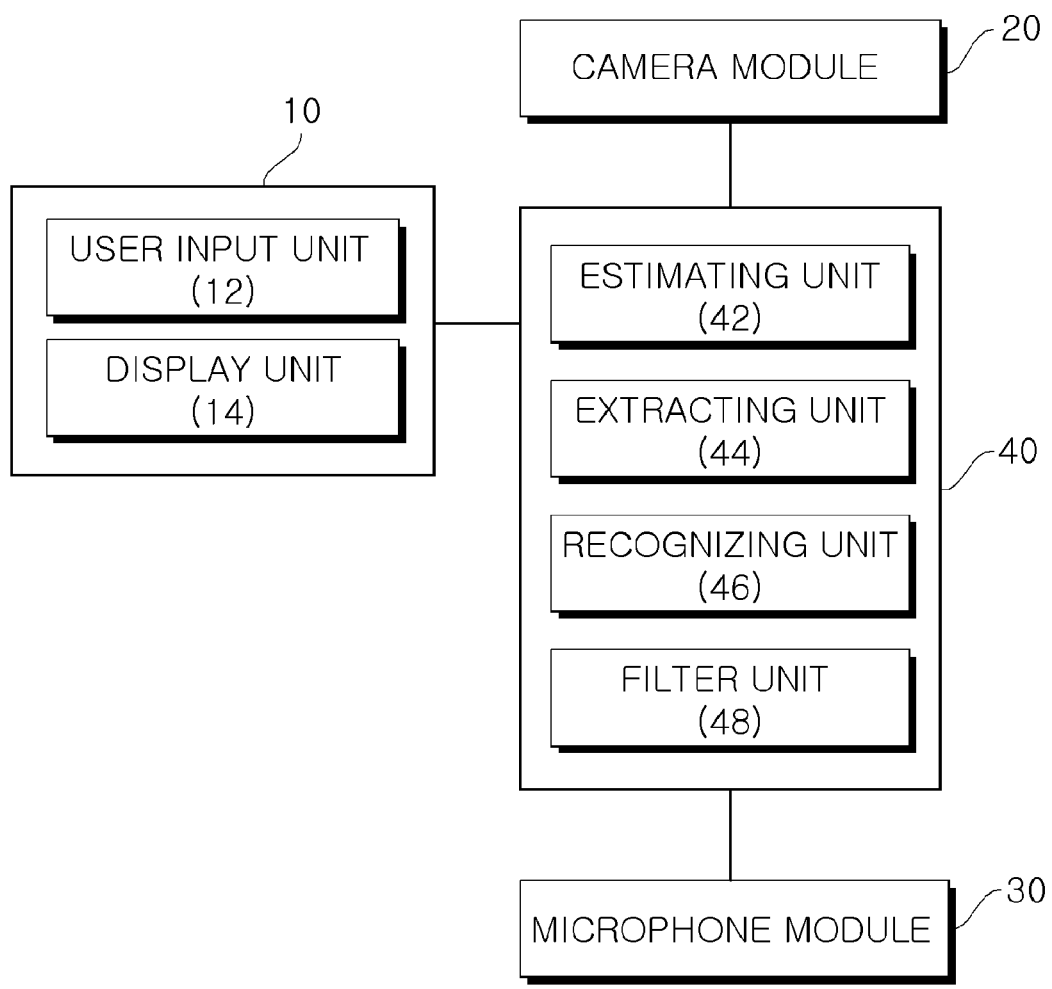
FIG. 1 is a control block diagram illustrating a control configuration of a mobile communication terminal according to a first exemplary embodiment.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

The following description illustrates only a principle of the present invention. Therefore, those skilled in the art may implement the principle of the present invention and invent various apparatuses, which are included in a concept and a scope of the present invention, even though not clearly described or illustrated in the specification. It should be understood that all conditional terms and exemplary embodiments, which are described in the specification, are clearly intended only to understand the concept of the invention, but the present invention is not limited to the exemplary embodiments and states as described above.

It should be understood that all detailed description, which specifies not only a principle, an aspect, and an exemplary embodiment, but also a specific exemplary embodiment, is intended to include structural and functional equivalents. It should be understood that such equivalents include all elements which are invented so as to perform the same function as the currently disclosed equivalents and equivalents, which will be developed in the future, regardless with the structure.

Therefore, for example, the block diagram of the present specification should be understood to represent an illustrative conceptual aspect which specifies the principle of the invention. Similarly, it should be understood that all of a flowchart, a status transitional view, and a pseudo code may be substantially represented in a computer readable medium and indicate various processes executed by a computer or a processor regardless of whether the computer or the processor is apparently illustrated.

Functions of various elements illustrated in the drawings including a functional block, which is represented by a processor or a concept similar thereto, may be provided by using not only an exclusive hardware but also a hardware which may execute a software with regard to an appropriate software. If the function is provided by the processor, the function may be provided by a single exclusive processor, a single shared processor or a plurality of individual processors, and some of them may be shared.

A precise usage of a processor, control or a terminology suggested as a concept similar thereto should not be interpreted by exclusively citing hardware, which is capable of executing software, but should be understood to implicatively include a digital signal processor (DSP), and a ROM, a RAM, and a nonvolatile memory which store hardware and software without any restrictions. Widely known and commonly used other hardware may also be included therein.

In claims of this specification, components represented as means to perform the function described in the detailed description are intended to include, for example, a combination of circuit elements which perform the above-mentioned functions or all methods which performs functions including all types of software including a firmware/microcode, and are combined with an appropriate circuit which executes the software in order to perform the function. In the invention defined by the claims, the functions provided by the variously described means are combined with each other and combined with the method demanded by the claims so that any means which may provide the above-mentioned function should be understood to be equivalent to be understood from the specification.

The above objects, features, and advantages will be more obvious from the detailed description with reference to the accompanying drawings, and accordingly, those skilled in the art to which the invention pertains will be able to easily implement the technical spirit of the invention. However, in describing the present invention, if it is considered that description of a related known technology may unnecessarily cloud the gist of the present invention, the description thereof will be omitted.

FIG. 1 is a control block diagram illustrating a control configuration of a mobile communication terminal according to a first exemplary embodiment.

Referring to FIG. 1, the mobile communication terminal may include an input module 10, a camera module 20, a microphone module 30, and a control module 40.

In the exemplary embodiment, it is described that the mobile communication terminal is a smart phone, but examples of the mobile communication terminal may include a portable phone, a notebook computer, a digital broadcasting terminal, a PDA (personal digital assistants), a PMP (portable multimedia player), a camera, a navigation, a tablet computer, or an e-book terminal in addition to the smart phone but are not limited thereto.

The input module 10 may include at least one of a user input unit 12 and a display unit 14. The input module 10 may further include all types of input devices which may control an operation of the mobile communication terminal, but is not limited thereto.

The user input unit 12 may be configured by a key pad, a dome switch, or a (static pressure/electrostatic) touch pad which may receive a command or arbitrary information by push or touch manipulation of the user.

The user input unit 12 may be configured by a manipulation system such as a jog wheel or a jog system or a joy stick which rotates a key, or a finger mouse. Specifically, if the touch pad and the display unit 14, which will be described below, form a layer structure together, the touch pad and the display unit 14 may be called a touch screen.

The display unit 14 displays and outputs information which is processed in the terminal. For example, if the mobile communication terminal is in a phone call mode, the display unit 14 displays a UI (user interface) or a GUI (graphic user interface) related to the phone call.

If the mobile communication terminal is in a video phone call mode or a capturing mode, the display unit 14 may individually or simultaneously display the image which is captured or received, and displays the UI or GUI.

As described above, when the display unit 14 and the user input unit 12 form a layer structure together to be configured as a touch screen, the display unit 14 may be used not only as the output device but also as an input device which may input information by a touch of the user.

If the display unit 14 is configured as a touch screen, the display unit 14 may include a touch display panel, and a touch display panel controller. In this case, the touch display panel is a transparent panel, which is attached outside the mobile communication terminal, to be connected to an internal bus of the mobile communication terminal. The touch display panel watches a touch result, and if there is a touch input, transmits corresponding signals to the touch display panel controller.

The touch display panel controller processes the signals and then transmits the corresponding data to a control module 50 so as to allow the control module 50 to confirm whether there is a touch input and which region of the touch screen is touched. The display unit 14 may be configured by e-Paper. The e-Paper is a kind of reflective display and has an excellent visual property such as a high resolution, a wide viewing angle, and a bright white background like paper and ink of the related art.

The e-Paper may be implemented even on any types of substrate such as a plastic, metal, or paper. An image on the e-Paper is maintained even after cutting off the power. The e-Paper does not have a backlight power source so that a battery life span of the mobile communication terminal may last for a longer time. As the e-Paper, a semi-circular twist ball in which static electricity is charged or an electrophoresis method or a micro capsule may be used.

The display unit 14 may include at least one of a liquid crystal display, a thin film transistor liquid crystal display, an organic light emitting diode, a flexible display, and a 3D display.

In accordance with the mobile communication terminal, two or more display units 14 may be provided. For example, the mobile communication terminal may simultaneously include an external display (not illustrated) and an internal display (not illustrated).

In the exemplary embodiment, it is described that the input module 10 inputs an executing command and an ending command which may receive a sound including a user voice uttered from the user, but the input module 10 may perform all functions described above and is not limited thereto.

When the executing command is input from the input module 10, the camera module 20 operates by the control module 40, and captures an image of a set area.

In this case, the camera module 20 may include at least one camera, and the number of cameras and the position where the camera is mounted are not limited.

When the sound including the user voice is input, the microphone module 30 may extract a sound level and a sound generating position corresponding to the sound.

That is, the microphone module 30 generates a stereophonic image including the sound level and the sound generating position extracted by receiving the sound input from the outside by a microphone in a phone call mode, a recording mode, and a voice recognition mode.

Here, the microphone module 30 may be at least one microphone or a 3D microphone array and may also be another device which is capable of recognizing the sound input from the outside, but is not limited thereto.

In the exemplary embodiment, the camera module 20 and the microphone module 30 have been represented by separate modules, but may be formed by one module. However, the invention is not limited thereto. When the executing command is input from the input module 10, the control module 40 may control the camera module 20 and the microphone module 30 to interwork with each other.

That is, the control module 40 may include an estimating unit 42 which estimates a position of the lip of the user from the image captured by the camera module 20, an extracting unit 44 which extracts a voice level and a voice generating position corresponding to the position of the lip of the user from the sound level and the sound generating position extracted from the microphone module 30, and a recognizing unit 46 which recognizes the voice of the user based on the voice level and the voice generating position.

The control module 40 may include a filter unit 48 which filters a noise component included in the sound level and the sound generating position or the voice level and the voice generating position.

In the exemplary embodiment, it is described that the filter unit 48 is included only in the control module 40, but the filter unit 48 may also be included in the microphone module 30, but the present invention is not limited thereto.

The estimating unit 42 may extract an image of a user face from the image and then estimate the position of the lip of the user by checking whether at least one of a motion and a depth is changed in the image of the user face.

That is, the estimating unit 42 may estimate the change of at least one of the motion and depth of the lip of the user during the uttering of the voice of the user to estimate the position of the lip of the user.

Thereafter, the extracting unit 44 may extract the voice generating position corresponding to the position of the lip of the user and the voice level in the voice generating position.

Therefore, the recognizing unit 46 may apply the voice level to a set user voice recognizing algorithm to recognize the voice of the user.

As described above, the mobile communication terminal according to the first exemplary embodiment may extract the position of the lip of the user, the voice level, and the voice generating position from an image even in an environment having lots of noises to precisely recognize the voice of the user.

The mobile communication terminal according to the first exemplary embodiment may easily recognize the voice of the user in a voice recognizing mode and a phone call mode.

Figure 2:
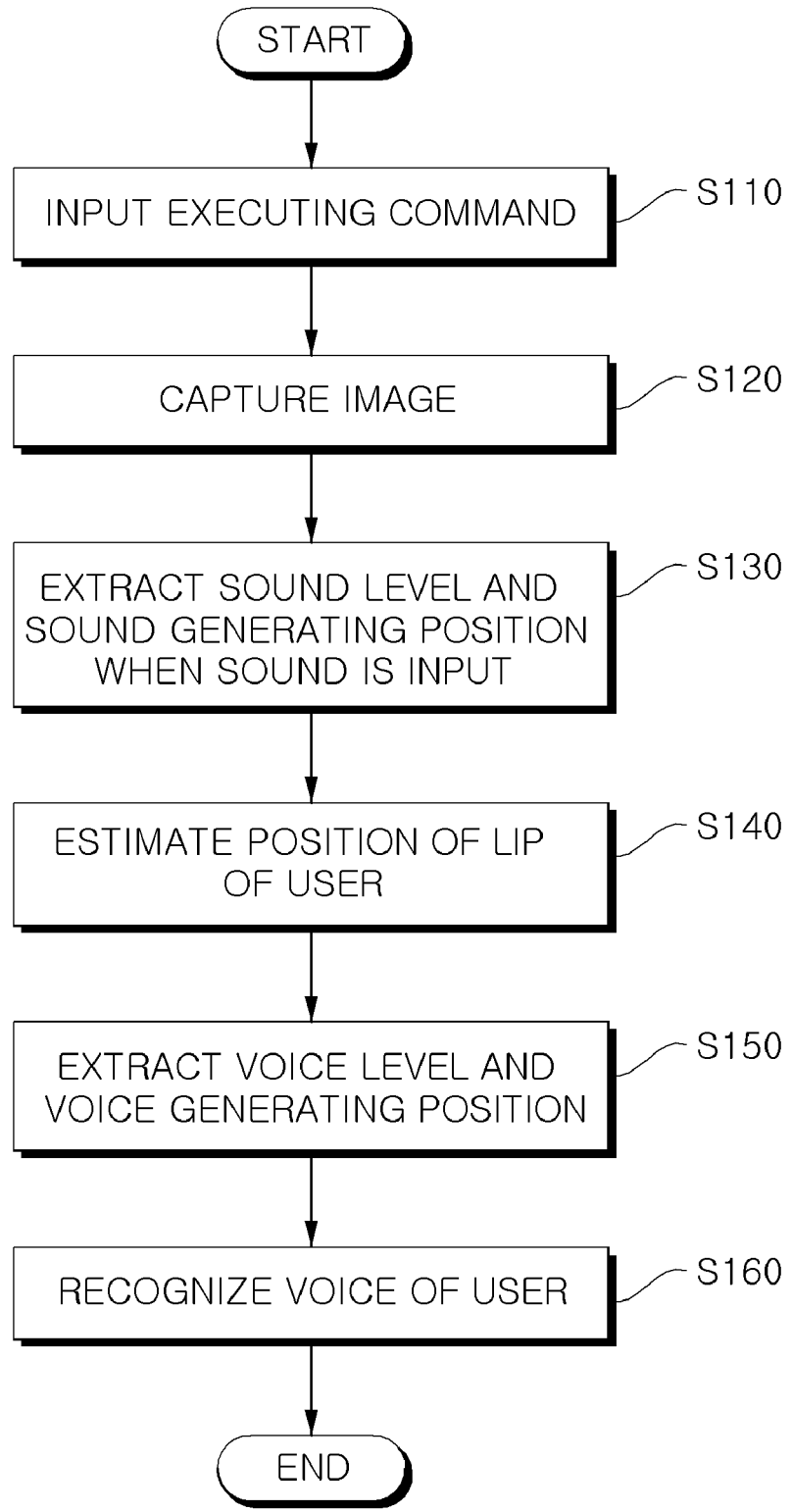
FIG. 2 is a flowchart illustrating an operation method of the mobile communication terminal according to the first exemplary embodiment.

FIG. 2 is a flowchart illustrating an operation method of the mobile communication terminal according to the first exemplary embodiment.

Referring to FIG. 2, if an executing command is input by a user in step S110, the mobile communication terminal captures an image of a set area in step S120.

In other words, if the executing command is input from the input module 10 by the user, the control module 40 operates the camera module 20 to capture the image of the set area.

Here, the image may include an image of the user.

In step S130, when a sound including the voice of the user is input, the mobile communication terminal extracts a sound level and a sound generating position corresponding to the sound.

In other words, the control module 40 allows the microphone module 30 and the camera module 20 to interwork with each other in accordance with the executing command to extract the sound level and the sound generating position when the sound including the voice of the user is input.

Thereafter, the mobile communication terminal estimates the position of the lip of the user from the image in step S140 and extracts a voice level and a voice generating position corresponding to the position of the lip of the user from the sound level and the sound generating position in step S150.

That is, the control module 40 may estimate a position where at least one of the motion and the depth is changed in the user image included in the image to estimate the position of the lip of the user.

Thereafter, the control module 40 may extract the voice generating position corresponding to the position of the lip of the user from the sound generating position and the voice level corresponding to the voice generating position.

The mobile communication terminal may recognize the voice of the user based on at least one of the voice generating position and the voice level in step S160.

That is, the control module 40 may use a user voice recognizing algorithm, which is set based on at least one of the voice generating position and the voice level, to recognize the voice of the user.

In the exemplary embodiment, the control module 40 may filter the noise component included in the sound level and the sound generating position or the voice level and the voice generating position, but the present invention is not limited thereto.

Figure 3:
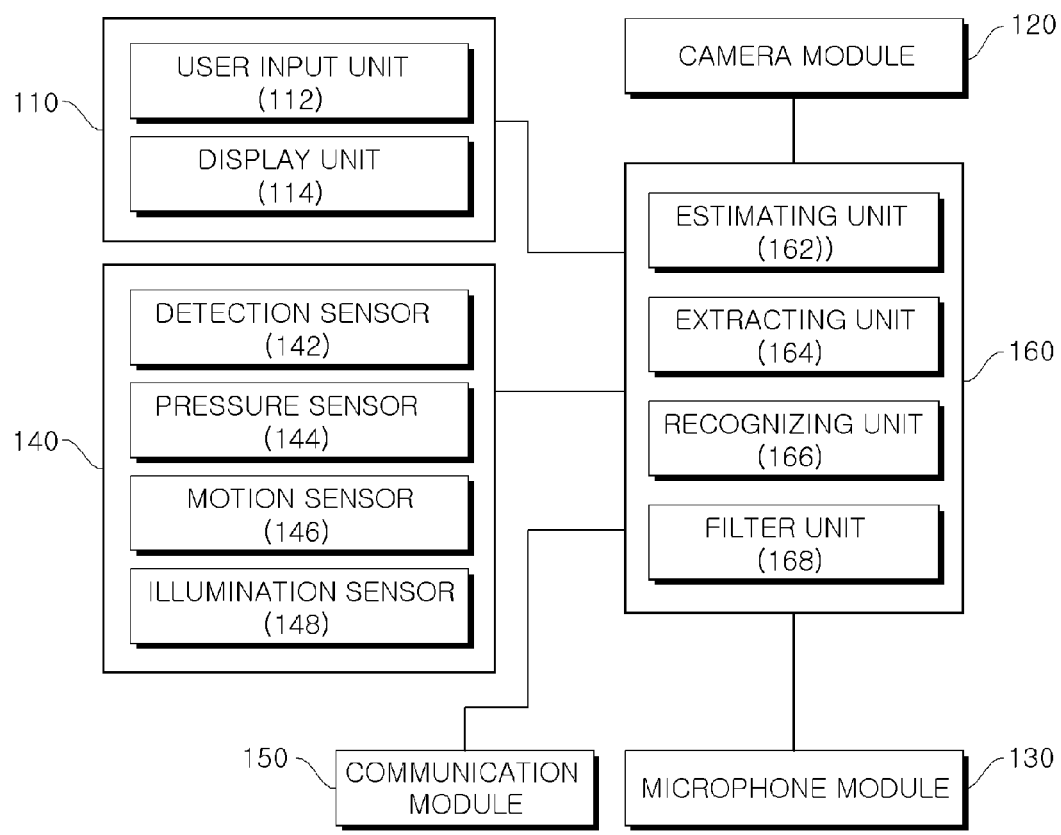
FIG. 3 is a control block diagram illustrating a control configuration of a mobile communication terminal according to a second exemplary embodiment.

FIG. 3 is a control block diagram illustrating a control configuration of a mobile communication terminal according to a second exemplary embodiment.

Referring to FIG. 3, the mobile communication terminal may include an input module 110, a camera module 120, a microphone module 130, a sensor module 140, a communication module 150, and a control module 160.

In the exemplary embodiment, it is described that the mobile communication terminal is a smart phone, but examples of the mobile communication terminal may include a portable phone, a notebook computer, a digital broadcasting terminal, a PDA (personal digital assistants), a PMP (portable multimedia player), a camera, a navigation, a tablet computer, or an e-book terminal in addition to the smart phone but are not limited thereto.

The input module 110 may include at least one of a user input unit 112 and a display unit 114. The input module 110 may further include all types of input devices which may control an operation of the mobile communication terminal, but is not limited thereto.

The user input unit 112 may be configured by a key pad, a dome switch, or a (static pressure/electrostatic) touch pad which may receive a command or arbitrary information by push or touch manipulation of the user.

The user input unit 112 may be configured by a manipulation system such as a jog wheel or a jog system or a joy stick which rotates a key, or a finger mouse. Specifically, if the touch pad and the display unit 114, which will be described below, form a layer structure, the touch pad and the display unit may be called a touch screen.

The display unit 114 displays and outputs information which is processed in the terminal. For example, if the mobile communication terminal is in a phone call mode, the display unit 114 displays a UI (user interface) or a GUI (graphic user interface) related to the phone call.

If the mobile communication terminal is in a video phone call mode or a capturing mode, the display unit 114 may individually or simultaneously display the image which is captured or received, and displays the UI or GUI.

As described above, when the display unit 114 and the user input unit 112 form a layer structure together to be configured as a touch screen, the display unit 114 may be used not only as the output device but also as an input device which may input information by a touch of the user.

If the display unit 114 is configured as a touch screen, the display unit 14 may include a touch display panel and a touch display panel controller. In this case, the touch display panel is a transparent panel, which is attached outside the mobile communication terminal, to be connected to an internal bus of the mobile communication terminal. The touch display panel watches a touch result, and if there is a touch input, transmits corresponding signals to the touch display panel controller.

The touch display panel controller processes the signals and then transmits the corresponding data to the control module 160 so as to allow the control module 160 to confirm whether there is a touch input and which region of the touch screen is touched.

The display unit 114 may be configured by e-Paper. The e-Paper is a kind of reflective display and has an excellent visual property such as a high resolution, a wide viewing angle, and a bright white background like paper and ink of the related art.

The e-Paper may be implemented even on any types of substrate such as a plastic, metal, or paper. An image on the e-Paper is maintained even after cutting off the power. The e-Paper does not have a backlight power source so that a battery life span of the mobile communication terminal may last for a longer time. As the e-Paper, a semi-circular twist ball in which static electricity is charged or an electrophoresis method or a micro capsule may be used.

The display unit 14 may include at least one of a liquid crystal display, a thin film transistor liquid crystal display, an organic light emitting diode, a flexible display, and a 3D display. In accordance with the mobile communication terminal, two or more display units 14 may be provided. For example, the mobile communication terminal may simultaneously include an external display (not illustrated) and an internal display (not illustrated).

In the exemplary embodiment, it is described that the input module 110 inputs an executing command and an ending command which may receive a sound including a user voice uttered from the user, but the input module 110 may perform all functions described above and is not limited thereto.

When the executing command is input from the input module 110, the camera module 120 operates by the control module 160, and captures an image of a set area.

In this case, the camera module 120 may include at least one camera, and the number of cameras and the position where the camera is mounted are not limited.

When the sound including the user voice is input, the microphone module 130 may extract a sound level and a sound generating position corresponding to the sound.

That is, the microphone module 30 generates a stereophonic image including the sound level and the sound generating position extracted by receiving the sound input from the outside by a microphone in a phone call mode, a recording mode, and a voice recognition mode.

Here, the microphone module 130 may be at least one microphone or a 3D microphone array, and may be another device which is capable of recognizing the sound input from the outside, but is not limited thereto.

In the exemplary embodiment, the camera module 120 and the microphone module 130 have been represented by separate modules, but may be formed by one module. However, the invention is not limited thereto.

The sensor module 140 detects a current status of the mobile communication terminal such as a switched status and a position of the mobile communication terminal and the contact of the user to generate a sensing signal in order to control the operation of the mobile communication terminal.

The sensor module 140 may include a detection sensor 142, a pressure sensor 144, a motion sensor 146, and an illumination sensor 148.

The detection sensor 142 may detect the presence of an object which approaches the mobile communication terminal or an object which is present near the mobile communication terminal without having any mechanical contact.

The detection sensor 142 may use the change in an AC magnetic field or a static magnetic field or a rate of change of an electrostatic capacitance to detect an approaching object.

The pressure sensor 144 may detect whether pressure is applied to the mobile communication terminal, and an intensity of the pressure.

The pressure sensor 144 may be provided in a portion of the mobile communication terminal, which requires the detection of the pressure, in accordance with a usage environment.

If the pressure sensor 144 is provided in the display unit 114, a touch input through the display unit 114 and a pressure touch input, which is larger than the touch input, may be distinguished from each other in accordance with a signal output from the pressure sensor 144.

It is possible to know an intensity of the pressure which is applied to the display unit 114 when the pressure touch is input, in accordance with a signal output from the pressure sensor 144.

The motion sensor 146 uses an acceleration sensor or a gyro sensor to detect a position or a motion of the mobile communication terminal.

The acceleration sensor, which may be used in the motion sensor 146, is an element which converts a change in acceleration in any one direction into an electrical signal, and is widely used in accordance with the development of MEMS (micro-electromechanical systems).

There are various types of acceleration sensors such as a sensor which is mounted in an airbag system of a vehicle to measure a large value of acceleration which is used for detecting a collision and a sensor which recognizes a micro motion of hands of human to measure a micro-value of acceleration which is used as an input unit for a game.

Generally, the acceleration sensor is configured such that two axes or three axes are mounted in one package, and in some usage environments, only one axis, for example, a Z-axis is required. Accordingly, in some reasons, if an acceleration sensor in an X-axis or a Y-axis direction needs to be used instead of the Z-axis direction, the acceleration sensor may be mounted by being stood on a main substrate using a separate sub-substrate. The gyro sensor is a sensor which measures an angular velocity, and may detect a direction which is rotated from a reference direction.

The illumination sensor 148 may measure a brightness of the outside. When a video call command is input from the input module 110, the illumination sensor 148 may be adjusted so that the camera module 120 easily recognizes the user and an external object from at least one of the user image and the external image.

The control module 160 may generally control operations of the modules and control the overall operation of the mobile communication terminal.

In the exemplary embodiment, when the executing command for a video call is input from the input module 110, the control module 160 may control the control module 120 and the microphone module 130 to interlock with each other.

That is, the control module 160 may include an estimating unit 162 which estimates a position of the lip of the user from the image captured by the camera module 120, an extracting unit 164 which extracts a voice level and a voice generating position corresponding to the position of the lip of the user from the sound level and the sound generating position extracted from the microphone module 130, and a recognizing unit 166 which recognizes the voice of the user based on the voice level and the voice generating position.

The control module 160 may include a filter unit 168 which filters a noise component included in the sound level and the sound generating position or the voice level and the voice generating position.

In the exemplary embodiment, it is described that the filter unit 168 is included only in the control module 160, but the filter unit 168 may also be included in the microphone module 130, but the invention is not limited thereto.

The estimating unit 162 may extract an image of a user face from the image and then estimate the position of the lip of the user by checking whether at least one of a motion and a depth is changed in the image of the user face.

That is, the estimating unit 162 may estimate the change of at least one of the motion and depth of the lip of the user during the uttering of the voice of the user to estimate the position of the lip of the user.

Thereafter, the extracting unit 164 may extract the voice generating position corresponding to the position of the lip of the user and the voice level in the voice generating position.

Therefore, the recognizing unit 166 may apply the voice level to a set user voice recognizing algorithm to recognize the voice of the user.

The control module 160 may operate at least one of the detection sensor 142, the pressure sensor 144, the motion sensor 146, and the illumination sensor 148 included in the sensor module 140 to receive a sensing value.

For example, when a sensing value, that is, a brightness is input from the illumination sensor 148 during the video call, the control module 160 applies an estimating algorithm set in accordance with the brightness to estimate a position where at least one of a color, a motion, and a depth is changed in the user image included in the image from the position of the lip of the user.

That is, when the image of the user face is clear or faint in the user image in accordance with the external brightness, the control module 160 may estimate a contour of the face to estimate the position of the lip of the user.

When the calling command is input, the control module 160 may estimate the position of the lip of the user based on the sensing value input from at least one of the detection sensor 142, the pressure sensor 144, and the motion sensor 146, for example, a sensing value with respect to the position of the mobile communication terminal, the touch pressure, and the motion of the user and extract the voice level and the voice generating position corresponding to the position of the lip of the user, thereby recognizing the voice of the user.

Thereafter, the control module 160 transmits the image data in which the user image and the user voice information are mixed to the outside through the communication module 150. When an ending command corresponding to the voice call is input from the input module 110, the control module 160 stops operations of the modules.

The mobile communication terminal according to the exemplary embodiment determines priority through the camera module, the 3D microphone module, and a plurality of sensors in accordance with a situation of the phone call location during a video call or a voice call to easily recognize the voice of the user, which is not affected by the external noise, from the voice and the image of the user.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A mobile communication terminal, comprising:
 a camera module which captures an image of a set area;
 a microphone module which, when a sound including a voice of a user is input, extracts a sound level and a sound generating position corresponding to the sound; and
 a control module which estimates a position of a lip of the user from the image, extracts a voice level from the sound level corresponding to the position of the lip of the user and a voice generating position from the sound generating position, and recognizes the voice of the user based on at least one of the voice level and the voice generating position.

2. The mobile communication terminal of claim 1, further comprising:
 an input module which receives the sound and inputs at least one of an executing command and an ending command,
 wherein the input module includes at least one of a touch display panel and a key pad.

3. The mobile communication terminal of claim 1, wherein the camera module captures an image of the set area in accordance with the control of the control module.

4. The mobile communication terminal of claim 1, wherein the microphone module interworks with the camera module in accordance with the control of the control module and extracts a stereophonic image including the sound level and the sound generating position corresponding to the input sound.

5. The mobile communication terminal of claim 1, wherein the microphone module is at least one of a microphone and a 3D microphone array.

6. The mobile communication terminal of claim 1, further comprising:
 an input module which receives the sound and inputs at least one of the executing command and the ending command,
 wherein when the executing command is input, the control module operates the camera module and the microphone module to receive the image, the sound level, and the sound generating position.

7. The mobile communication terminal of claim 1, wherein the control module includes:
 an estimating unit which estimates a position of a lip of the user from the image;
 an extracting unit which extracts the voice level and the voice generating position corresponding to the position of the lip of the user from the sound level and the sound generating position; and
 a recognizing unit which recognizes the voice of the user based on the voice level and the voice generating position.

8. The mobile communication terminal of claim 7, wherein the control module includes a filter unit which filters a noise component included in the sound level and the sound generating position or the voice level and the voice generating position.

9. An operation method of a mobile communication terminal, comprising:
 capturing an image of a set area;
 extracting, when a sound including a voice of a user is input, a sound level and a sound generating position corresponding to the sound;
 estimating a position of a lip of the user from the image,
 extracting a voice level and a voice generating position corresponding to the position of the lip of the user from the sound level and the sound generating position, and
 recognizing the voice of the user based on at least one of the voice level and the voice generating position.

10. The operation method of claim 9, further comprising:
 before the capturing, inputting an executing command which captures the set area.

11. The operation method of claim 9, wherein the estimating estimates a position where at least one of a motion and a depth is changed in an image of a face of the user included in the image, from the position of the lip of the user.

12. The operation method of claim 9, wherein the extracting extracts the voice generating position corresponding to the position of the lip of the user from the sound generating position and the voice level corresponding to the voice generating position from the sound level.

13. A mobile communication terminal, comprising:
 a camera module which extracts an image of a user during a video call;
 a microphone module which, when a sound including a voice of a user is input, extracts a sound level and a sound generating position corresponding to the sound; and
 a control module which estimates a position of a lip of the user included in the user image, extracts a voice generating position corresponding to the position of the lip of the user from the sound generating position and a voice level corresponding to the voice generating position from the sound level the sound, recognizes the voice of the user, and generates image data in which the user image and the user voice are mixed.

14. The mobile communication terminal of claim 13, further comprising:
 an input module which inputs at least one of an executing command and an ending command which receives the sound,
 wherein the input module includes at least one of a touch display panel and a key pad.

15. The mobile communication terminal of claim 13, wherein the camera module is at least one of a microphone and a 3D microphone array.

16. The mobile communication terminal of claim 13, wherein the microphone module interworks with the camera module in accordance with the control of the control module, and extracts a stereophonic image including the sound level and the sound generating position corresponding to the input sound.

17. The mobile communication terminal of claim 13, further comprising:
 an input module which inputs an executing command and an ending command for the video call,
 wherein when the executing command is input, the control module operates the camera module and the 3d microphone module to receive the image of the user, the sound level, and the sound generating position.

18. The mobile communication terminal of claim 13, wherein the control module includes:
 an estimating unit which estimates a position of a lip of the user from the image;
 an extracting unit which extracts the voice level and the voice generating position corresponding to the position of the lip of the user from the sound level and the sound generating position;

a filter unit which filters a noise component included in the sound level and the sound generating position or the voice level and the voice generating position; and a recognizing unit which recognizes the voice of the user based on the voice level and the voice generating position which are filtered by the filter unit.

19. The mobile communication terminal of claim 18, wherein the estimating unit estimates the position of the lip of the user based on the change of at least one of a color, a motion, and a depth from the user image.

20. The mobile communication terminal of claim 14, further comprising:

a communication module which transmits the image data to the outside in accordance with the control of the control module.

* * * * *